United States Patent Office 2,761,783
Patented Sept. 4, 1956

2,761,783

PROCESS OF PRODUCING A SWEETENING COMPOSITION

Edgar A. Ferguson, Jr., Brooklyn, N. Y.

No Drawing. Application March 8, 1954,
Serial No. 414,889

15 Claims. (Cl. 99—141)

The present invention relates to new and useful sweetening compositions and to methods of producing the same.

One of the primary difficulties for persons advised to reduce their caloric intake, whether for medical reasons or simply for reasons of diet, is the necessity of suddenly reducing their intake of sweets. Generally, they are told to stop taking sugar because of the high caloric value thereof, and to substitute artificial sweetener such as saccharines and sucaryls. For a very few persons this might be satisfactory, but for the great majority of people this is both difficult to do and undesirable.

After extensive study, I have found that the difficulty and undesirability of depending on the artificial sweeteners is due mainly to the following: (1) People taking the artificial sweeteners actually miss the caloric effect of the sugar; and (2) such people also miss the syrupy effect on the tongue and taste of the sugar. This latter "natural" effect of the sugar may be divided into two parts: (a) the effect on the buccal membranes in the mouth; and (b) the syrupiness of the sugar which gives the only true natural feeling of sweetness.

It may therefore be seen that the elimination of "natural" sugar from the diet and the substitution of the artificial sweeteners therefor, which are taken in thin watery solutions of tiny, and in fact minute amounts, is unsatisfactory from both the physiological and psychological standpoints.

It is therefore a primary object of the present invention to provide sweetening compositions which have little caloric value and which from both the physiological and psychological standpoint overcome all of the disadvantages of the known artificial sweeteners.

It is another object of the present invention to provide sweetening compositions which have little caloric value and which satisfy the craving for sweets much better than do the artificial sweeteners themselves, in fact to an extent which is equivalent to natural sugar, while supplying much fewer calories than natural sugar.

It is a further object of the present invention to provide a process of producing the sweetening compositions of the present invention so that the same will always give equal results.

Other objects and advantages of the present invention will be apparent from a further reading of the specification and the appended claims.

With the above objects in view, the present invention mainly comprises, a composition essentially consisting of a natural sugar and at least one artificial sweetener in an amount sufficient to make the composition between 2–4 times as sweet as said natural sugar.

The term "artificial sweetener" as used throughout the specification and claims is meant to refer to all those artificial sweetening agents of little or no caloric value which are utilized as a substitute for sugar, i. e. saccharine and salts thereof such as sodium saccharine, and the sucaryls and their salts such as sodium sucaryl and calcium sucaryl (sodum cyclamate and calicum cyclamate).

I have found that a small amount of the natural sugar component such as sucrose, is all that is necessary to supply the physiological and psychological need of the individual, provided the difference in degree of sweetness between the small amount of natural sugar and the usual amount of natural sugar is made up for by an artificial sweetener. Although the full amount of the natural sweetener will supply the physiological and psychological need of the individual for sweetness, this is undesirable because of the high caloric value thereof, which in fact is the reason for the need for artificial sweeteners. Similarly, although the artificial sweeteners alone can supply all the sweetness necessary without supplying calories, as explained above, these artificial sweeteners do not satisfy the craving for sweets.

However, the combination of the artificial sweetener with the natural sugar particularly in the ratios which will be indicated, supplies both the physiological and psychological sweetness without supplying a large amount of calories. Moreover, this combination also has the advantage of avoiding the bitter metallic after-taste often found by people taking the artificial sweeteners.

Although the scope of the present invention is not meant to be limited to any theory as to how or why the combination of the present invention has these unusual effects, it being sufficient to point out that these effects are present, the following theory is given in the hope that it will help others to better understand the invention.

Apparently, only a small amount of natural sugar, such as cane sugar, is necessary to supply the physiological and psychological effect of sweetness with respect to the syrupy effect on the tongue and buccal membranes so that a person taking the same has the physiological lift due to the syrupy effect and part of the psychological lift due to the full bodied caloric taste of the natural sugar. This, in combination with the sweetening effect from the noncaloric artificial sweetener, supplies the full sweetening effect to a person on a diet without supplying a large amount of calories.

It has been found according to the present invention that the amount of natural sugar which a person ordinarily uses may be reduced to one-quarter (¼) by replacing the sweetness of the other three-quarters (¾) by an artificial sweetener. For example, one who normally uses two teaspoons of natural sugar in a cup of coffee can achieve the same sweetening effect, not only as to sweetness per se, but also with respect the psychological and physiological effect of sweetness, utilizing only ½ teaspoon of sugar and making up the balance of sweetness per se with an artificial sweetener, i. e. ⅜ grain of saccharine.

The lower limit of ¼ the normal amount of natural sugar utilized by the person, with the remainder of the sweetness made up by an artificial sweetener, has been found necessary since below this amount of sugar the physiological and psychological advantages of utilizing sugar in the combination is lost. Although from the psychological and physiological viewpoint there is no upper limit to the amount of natural sugar to be utilized in the composition, as a practical matter, the upper limit is ½ the normal amount of sugar since the purpose of the composition is to achieve natural sweetness with lowered caloric intake and supplying more than half the number of calories would be impractical in its effect.

The amount of artificial sweetener necessary to make up the difference in sweetness between the amount of sugar utilized and the normal amount of sugar depends upon the particular artificial sweetener. The sucaryls or cyclamates are about 50 times as sweet as sugar and the saccharines are about 200 times as sweet as sugar. It is simple to determine from this what amount of the particular artificial sweetener is necessary.

Organoleptic tests made in accordance with the recommendations of "Sensory methods for measuring differences in food quality," Agriculture Information Bulletin No. 34, Bureau of Human Nutrition and Home Economics, put out by the United States Department of Agriculture, show that within the limits given above the following favorable results are achieved: Although the caloric intake is cut from ½ to ¼ of the normal caloric intake for the purpose of sweetening, individuals utilizing the compositions of the present invention could not distinguish between the compositions and natural sugar. Thus, a sufficient sweetening effect was obtained from both the physiological and psychological standpoint to achieve natural sweetening while lowering the caloric intake at least 50%.

Another object of the present invention is the provision of a process of producing the compositions of the present invention. It is of course inconvenient for desiring to utilize the compositions of the present invention to mix the natural sugar with the artificial sweetener just prior to use. And the ordinary mixing of the ingredients by the manufacturer and sale of the mixed composition has the disadvantages that the artificial sweetener is a light powder in comparison to the heavy granules of sugar so that a sifting and floating occurs during handling of the package in improper proportioning of the components.

With the object of overcoming this difficulty the present invention mainly comprises a process of producing a sweetening composition, comprising the steps of mixing an artificial sweetener with an approximately equal amount of natural sugar and a minor proportion of at least one hydrophyllic colloid, wetting the thus formed mixture with an aqueous-alcohol solution, drying the thus wetted mixture, grinding the thus dried mixture, and mixing the thus ground mixture with an amount of natural sugar such that the thus formed composition is between 2–4 times as sweet as said natural sugar.

The usual pharmaceutical practice of mixing a light substance with a heavy substance by dissolving both substances in a solvent such as water and recrystallizing—the well known granulation process—is highly expensive and could not be utilized with the present invention from the point of view of economy. Furthermore, this pharmaceutical granulation process is usually utilized in the preparation of tablets and it is not suitable for the manufacture of a product which is intended to be kept in powdery or granular state.

I have found that the above disadvantages in the manufacture of my compositions can be overcome by the following process:

The total amount of artificial sweetener is mixed with an equal amount of granular natural sugar. To this mixture is added a small amount of a hydrophilic colloid such as a colloid gum of the type of acacia, gum arabic, karaya gum, etc. or carboxymethylcellulose and the like hydrophilic colloid is preferably about 0.4–1.2 grams per pound of artificial sweetener, and most preferably about 0.8 gram per pound of artificial sweetener.

Then, per each pound of artificial sweetener there is added 75–125 cc., and preferably 100 cc. of an aqueous alcohol solution, preferably 90% alcohol plus 10% water, so as to just wet the particles of the mixture of artificial sweetener. Upon drying the product cakes.

The caked product is then ground by gentle means to the size of granular sugar, taking care not to powder the product. This granular product may then be mixed with the remaining amount of natural sugar and is found to mix readily and to remain as a homogeneous mixture even after standing for long periods of time.

The following examples are given as illustrative of the present invention, the scope of the invention not however being limited to the specific details of the examples.

Example 1

1.75 pounds of calcium sucaryl is mixed with 1.75 pounds of granulated cane sugar. 2.1 grams of guar gum is added to the mixture. 175 cc. of 90% alcohol is then admixed with the mixture until all the particles are wetted therewith. The resulting mixture is then allowed to dry whereupon it cakes.

The caked mass is then ground gently until the particles are about the size of granulated cane sugar whereupon it is mixed with 98.25 pounds of cane sugar until homogeneously mixed. The resulting product is approximately twice as sweet as ordinary sugar.

Organoleptic tests showed that it was impossible to tell the difference in taste or effect between natural sugar and this composition although the composition has ½ the calories of natural sugar per unit of sweetness.

Example 2

A composition is prepared as in Example 1 utilizing however 3½ pounds of sodium sucaryl with a total of 100 pounds of cane sugar with 2.8 grams of gum arabic and 350 cc. of 90% alcohol in the manufacture.

This composition is about four times as sweet as ordinary sugar and is indistinguishable from ordinary sugar by organoleptic tests.

Example 3

A composition is prepared as in Example 1 utilizing 0.35 pound of sodium saccharine per 100 pounds total of natural cane sugar. This composition, which cannot be distinguished from ordinary sugar by organoleptic tests is twice as sweet, thus giving ½ the calories per unit of sweetness.

Example 4

A composition is prepared as in Example 1 utilizing 0.7 pound of saccharine per 100 pounds total of cane sugar. The composition is indistinguishable from natural sugar by organoleptic tests and is four times as sweet as natural sugar.

Without further analysis, the foregoing will so fully reveal the gist of the present invention that others can by applying current knowledge readily adapt it for various applications without omitting features that, from the standpoint of prior art, fairly constitute essenial characteristics of the generic or specific aspects of this invention to be comprehended within the meaning and range of equivalence of the following claims.

What is claimed as new and desired to be secured by Letters Patent is:

1. A process of producing a sweetening composition, comprising the steps of mixing an artificial sweetener with an approximately equal amount of natural sugar and a minor proportion of at least one hydrophilic colloid; wetting the thus formed mixture with an aqueous-alcohol solution; drying the thus wetted mixture; grinding the thus dried mixture; and mixing the thus ground mixture with an amount of natural sugar such that the thus formed composition is between 2–4 times as sweet as said natural sugar.

2. A process of producing a sweetening composition, comprising the steps of mixing an artificial sweetener with an approximately equal amount of natural sugar and a minor proportion of at least one hydrophilic colloid; wetting the thus formed mixture with an aqueous-alcohol solution; drying the thus wetted mixture; grinding the thus dried mixture to approximately the size of granular sugar; and mixing the thus ground mixture with an amount of natural sugar such that the thus formed composition is between 2–4 times as sweet as said natural sugar.

3. A process of producing a sweetening composition comprising the steps of mixing an artificial sweetener with an approximately equal amount of natural sugar and a minor proportion of at least one hydrophilic colloid; wetting the thus formed mixture with a 90% alcohol solution; drying the thus wetted mixture; grinding the thus dried mixture to approximately the size of granular sugar; and mixing the thus ground mixture with an amount of natural sugar such that the thus formed composition is between 2–4 times as sweet as said natural sugar.

4. A process of producing a sweetening composition, comprising the steps of mixing an artificial sweetener with an approximately equal amount of natural sugar and a minor proportion of at least one hydrophilic colloid; wetting the thus formed mixture with a 90% alcohol solution in an amount of 75–125 cc. solution per pound of artificial sweetener; drying the thus wetted mixture; grinding the thus dried mixture; and mixing the thus ground mixture with an amount of natural sugar such that the thus formed composition is between 2–4 times as sweet as said natural sugar.

5. A process of producing a sweetening composition comprising the steps of mixing an artificial sweetener with an approximately equal amount of natural sugar and a minor proportion of at least one hydrophilic colloid; wetting the thus formed mixture with an aqueous-alcohol solution in an amount of 100 cc. solution per each pound of artificial sweetener; drying the thus wetted mixture; grinding the thus dried mixture; and mixing the thus ground mixture with an amount of natural sugar such that the thus formed composition is between 2–4 times as sweet as said natural sugar.

6. A process of producing a sweetening composition, comprising the steps of mixing an artificial sweetener with an approximately equal amount of natural sugar and a minor proportion of at least one hydrophilic colloid in an amount of 0.4–1.2 grams hydrophilic colloid per each pound of artificial sweetener; wetting the thus formed mixture with an aqueous-alcohol solution; drying the thus wetted mixture; grinding the thus dried mixture; and mixing the thus ground mixture with an amount of natural sugar such that the thus formed composition is between 2–4 times as sweet as said natural sugar.

7. A process of producing a sweetening composition, comprising the steps of mixing an artificial sweetener with an approximately equal amount of natural sugar and a minor proportion of at least one hydrophilic colloid in an amount of 0.4–1.2 grams hydrophilic colloid per each pound of artificial sweetener; wetting the thus formed mixture with an aqueous-alcohol solution in an amount of 75–125 cc. solution per each pound of artificial sweetener; drying the thus wetted mixture; grinding the thus dried mixture; and mixing the thus ground mixture with an amount of natural sugar such that the thus formed composition is between 2–4 times as sweet as said natural sugar.

8. A process of producing a sweetening composition, comprising the steps of mixing an artificial sweetener with an approximately equal amount of natural sugar and a minor proportion of guar gum; wetting the thus formed mixture with an aqueous-alcohol solution; drying the thus wetted mixture; grinding the thus dried mixture; and mixing the thus ground mixture with an amount of natural sugar such that the thus formed composition is between 2–4 times as sweet as said natural sugar.

9. A process of producing a sweetening composition, comprising the steps of mixing an artificial sweetener with an approximately equal amount of natural sugar and a minor proportion of gum arabic; wetting the thus formed mixture with an aqueous-alcohol solution; drying the thus wetted mixture; grinding the thus dried mixture; and mixing the thus ground mixture with an amount of natural sugar such that the thus formed composition is between 2–4 times as sweet as said natural sugar.

10. A process of producing a sweetening composition, comprising the steps of mixing an artificial sweetener with an approximately equal amount of natural sugar and a minor proportion of gum arabic in an amount of 0.4–1.2 grams hydrophilic colloid per each pound of artificial sweetener; wetting the thus formed mixture with an aqueous-alcohol solution in an amount of 75–125 cc. solution per each pound of artificial sweetener; drying the thus wetted mixture; grinding the thus dried mixture; and mixing the thus ground mixture with an amount of natural sugar such that the thus formed composition is between 2–4 times as sweet as said natural sugar.

11. A process of producing a sweetening composition, comprising the steps of mixing a cyclamate artificial sweetener with an approximately equal amount of natural sugar and a minor proportion of at least one hydrophilic colloid; wetting the thus formed mixture with an aqueous-alcohol solution; drying the thus wetted mixture; grinding the thus dried mixture with an amount of natural sugar such that the thus formed composition is between 2–4 times as sweet as said natural sugar.

12. A process of producing a sweetening composition, comprising the steps of mixing a saccharine artificial sweetener with an approximately equal amount of natural sugar and a minor proportion of at least one hydrophilic colloid; wetting the thus formed mixture with an aqueous-alcohol solution; drying the thus wetted mixture; grinding the thus dried mixture; and mixing the thus ground mixture with an amount of natural sugar such that the thus formed composition is between 2–4 times as sweet as said natural sugar.

13. A process of producing a sweetening composition, comprising the steps of mixing a cyclamate artificial sweetener with approximately equal amount of natural sugar and a minor proportion of at least one hydrophilic colloid in an amount of 0.4–1.2 grams hydrophilic colloid per each pound of artificial sweetener; wetting the thus formed mixture with an aqueous-alcohol solution in an amount of 75–125 cc. solution per each pound of artificial sweetener; drying the thus wetted mixture; grinding the thus dried mixture; and mixing the thus ground mixture with an amount of natural sugar such that the thus formed composition is between 2–4 times as sweet as said natural sugar.

14. A process of producing a sweetening composition, comprising the steps of mixing a saccharine artificial sweetener with an approximately equal amount of natural sugar and a minor proportion of at least one hydrophilic colloid in an amount of 0.4–1.2 grams hydrophilic colloid per each pound of artificial sweetener; wetting the thus formed mixture with an aqueous-alcohol solution in an amount of 75–125 cc. solution per each pound of artificial sweetener; drying the thus wetted mixture; grinding the thus dried mixture; and mixing the thus ground mixture with an amount of natural sugar such that the thus formed composition is between 2–4 times as sweet as said natural sugar.

15. A process of producing a sweetening composition, comprising the steps of mixing sodium cyclamate artificial sweetener with an approximately equal amount of natural sugar and a minor proportion of at least one hydrophilic colloid in an amount of 0.4–1.2 grams hydrophilic colloid per each pound of artificial sweetener; wetting the thus formed mixture with an aqueous-alcohol solution in an amount of 75–125 cc. solution per each pound of artificial sweetener; drying the thus wetted mixture; grinding the thus dried mixture; and mixing the thus ground mixture with an amount of natural sugar such that the thus formed composition is between 2–4 times as sweet as said natural sugar.

References Cited in the file of this patent

UNITED STATES PATENTS

| | | |
|---|---|---|
| 326,281 | Fahlberg | Sept. 15, 1885 |
| 851,221 | Chaplin | Apr. 23, 1907 |
| 2,430,553 | Bigelow | Nov. 11, 1947 |
| 2,629,665 | Gordon | Feb. 24, 1953 |

FOREIGN PATENTS

| | | |
|---|---|---|
| 9,669 | Great Britain | 1900 |